G. I. HOHL.
SEALING MACHINE.
APPLICATION FILED APR. 20, 1917.
1,262,342.
Patented Apr. 9, 1918.
3 SHEETS—SHEET 2.
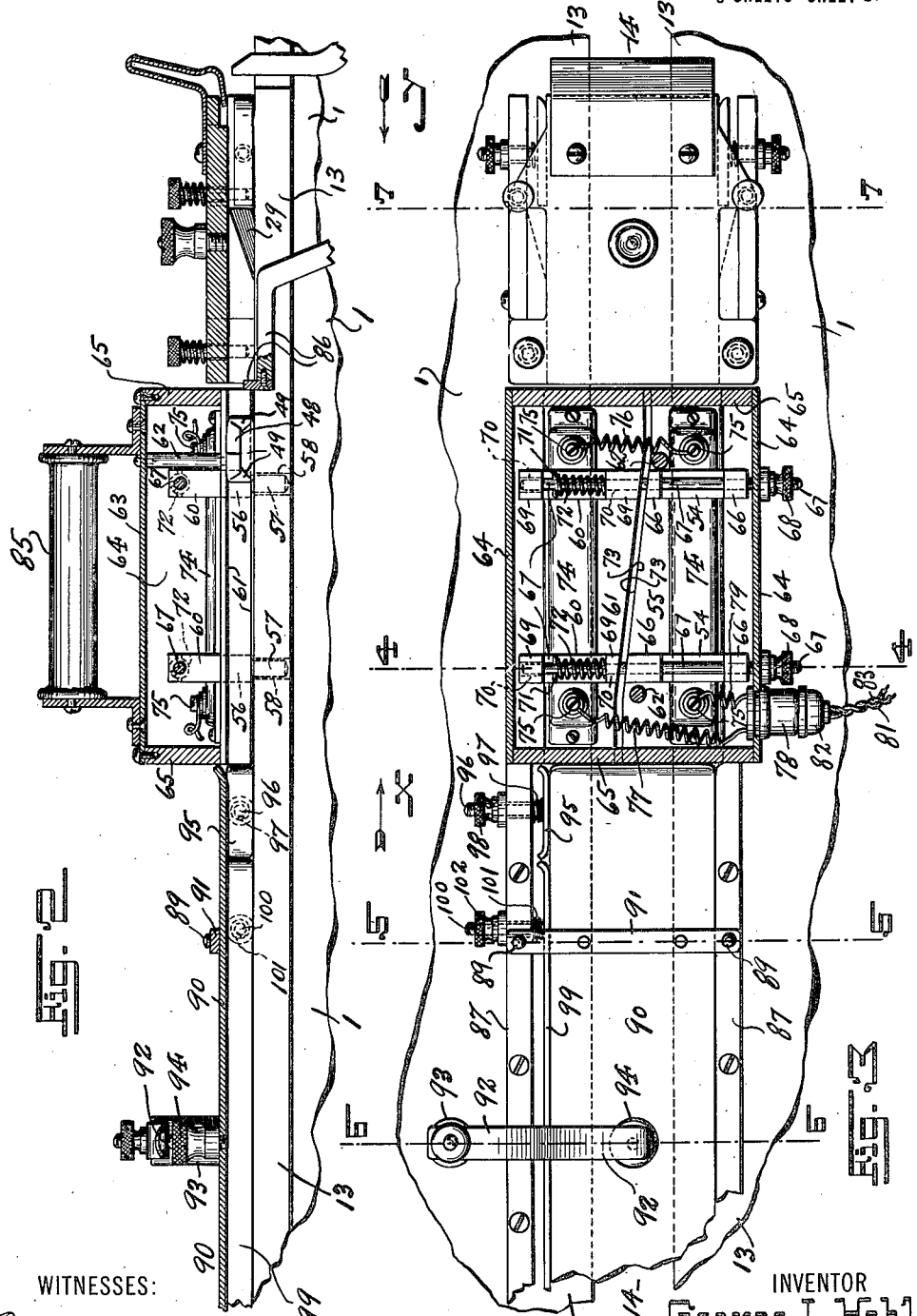
WITNESSES:
INVENTOR
George I. Hohl,
BY
ATTORNEYS

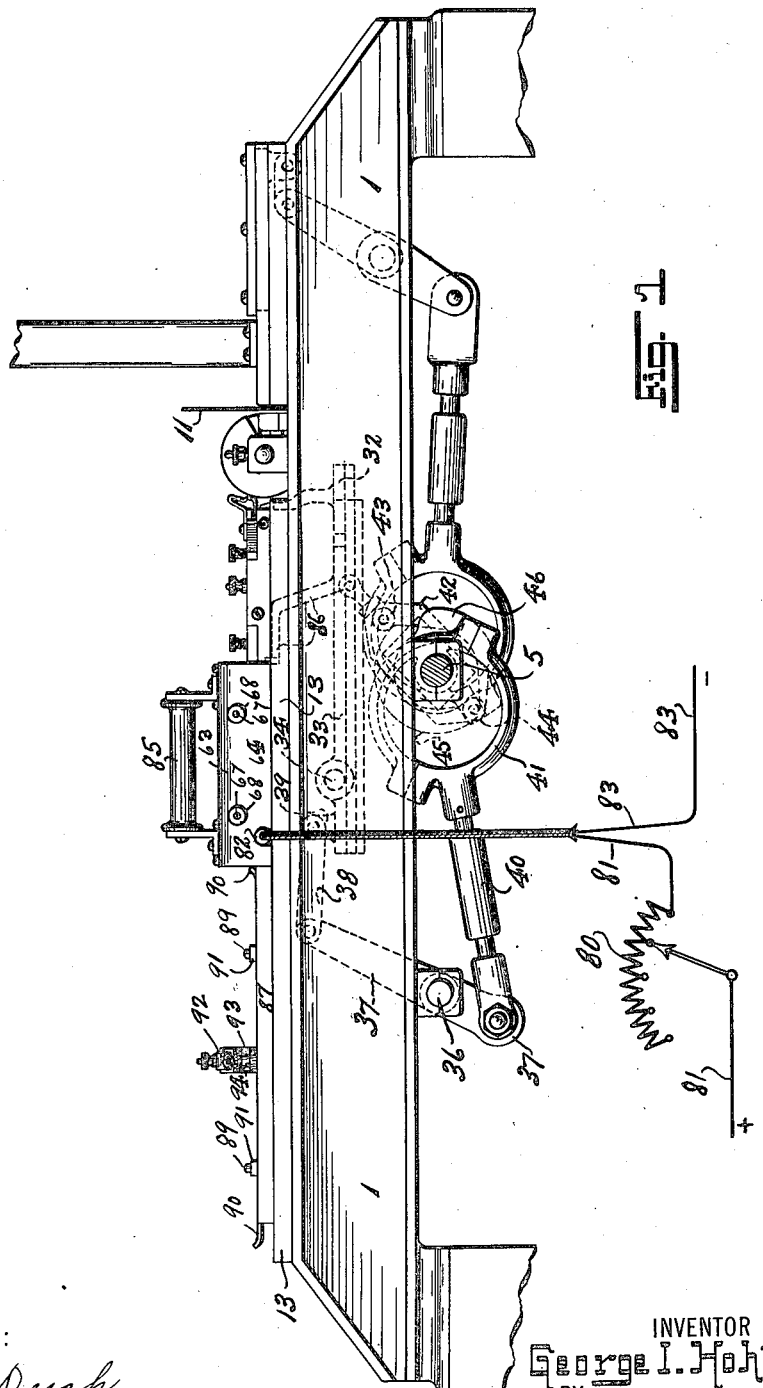

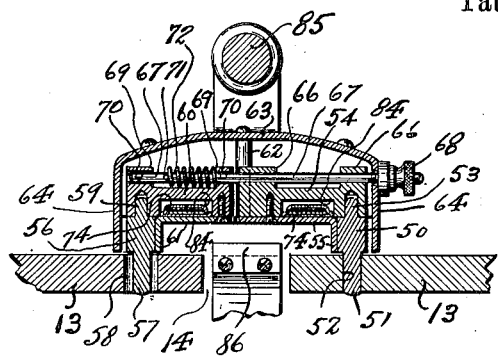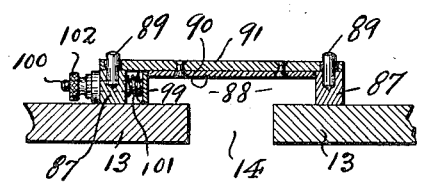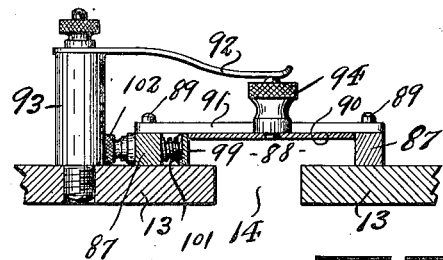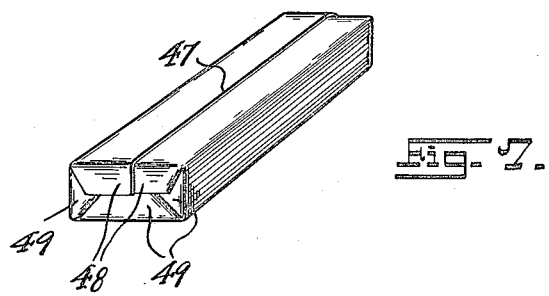

UNITED STATES PATENT OFFICE.

GEORGE I. HOHL, OF NEWARK, NEW JERSEY, ASSIGNOR TO ANY PACKAGE WRAPPING CO., A CORPORATION OF NEW JERSEY.

SEALING-MACHINE.

1,262,342.  Specification of Letters Patent.  Patented Apr. 9, 1918.

Application filed April 20, 1917. Serial No. 163,378.

*To all whom it may concern:*

Be it known that I, GEORGE I. HOHL, a citizen of the United States, residing at Newark, in the county of Essex and State of New Jersey, have invented certain new and useful Improvements in Sealing-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in automatic wrapping machines; and, the invention relates, more particularly, to a novel construction of apparatus, and the devices and parts thereof, by means of which articles and packages may be wrapped in a waxed wrapper which is treated to hermetically seal the article or package within such wrapper.

The invention has for its principal object to provide a novel and simple sealing mechanism, the sealing devices of which comprise a novel combination of mechanical and electrical elements so operating that an article or package may be inclosed in a waxed outer covering or wrapper which is, at the final stage of the wrapping operations, subjected to heat so applied thereto as to sufficiently melt the wax in the covering or wrapper as to cause the several folds and wraps of the same to adhere together, thus hermetically sealing the article or package within said wrapper and affording a moisture proof, clean and sanitary protecting envelop about the said article or package.

Other objects of the present invention, not at this time more particularly enumerated, will be clearly understood from the following detailed description of the present invention.

With the various objects of the present invention in view, the same consists, primarily, in the novel sealing mechanism hereinafter set forth; and, furthermore, this invention consists in the novel arrangements and combinations of the various devices and parts, as well as in the details of the construction of the same, all of which will be hereinafter more fully described in the following specification, and then finally embodied in the claims which are appended to and which form an essential part of the specification.

The invention is clearly illustrated in the accompanying drawings, in which:—

Figure 1 is a side elevation of the novel sealing machine, made according to and embodying the principles of the present invention.

Fig. 2 is a vertical longitudinal section of the sealing mechanism, drawn on an enlarged scale.

Fig. 3 is a plan view of said sealing mechanism, the cover portion of the same being shown in section so as to disclose the interior parts thereof.

Fig. 4 is a transverse section taken on line 4—4 in said Fig. 3; Fig. 5 is also a transverse section taken on line 5—5 in said Fig. 3; and Fig. 6 is another transverse section taken on line 6—6 in said Fig. 3; all of said sections being viewed in the direction of the arrow *x*.

Fig. 7 is a perspective view of a wrapped and sealed package, as the same appears when delivered from the machine.

Similar characters of reference are employed in all of the hereinabove described views to indicate corresponding parts.

Referring now to the said drawings the reference character 1 indicates a pair of sideframes upon which the novel sealing mechanism, made according to and embodying the principles of my present invention, is mounted.

The reference character 13 indicates a pair of supporting plates or platforms, which are respectively secured to said sideframe 1. Said supporting plates or platforms extend horizontally toward each other, and are arranged to provide an intervening open space 14 between their opposed ends for purposes subsequently to be disclosed. The upper surfaces of said supporting plates or platforms 13 are so alined with said wrapping mechanism (a portion of the latter being supported thereon), that the articles or packages and their wrappers are received thereupon, as they are ejected from said wrapping mechanism.

The reference character 32 indicates a reciprocating propeller-bar, which is slidably supported upon a pivoted guide-cradle 33, which is pivotally supported on a fulcrum shaft 34 extending between the side-frames 1. Connected with said propeller-bar 32 is an upwardly extending propelling finger 86, which is adapted to be projected upwardly in front of the article or package and its wrapper, after the same have been ejected from the wrapping mechanism, so as to engage the same upon a proper operation of said propelling-bar 32, to push the same rearwardly through the sealing mechanism subsequently described. Said propelling-finger 86 at such time moves through the intervening space 14 between the plates or platforms 13. The means for producing the properly timed reciprocations of said propeller-bar 32, comprises the following elements:—Journaled in connection with said side-frames 1, so as to extend transversely therebetween, is a rock-shaft 36 upon which is mounted a lever-member 37. Pivotally connected with the upper end of said lever-member 37, by means of coupling-links 38, is the draw-ear or lug 39 of said propeller-bar 32. The lower end of said lever-member 37 is pivotally secured to the connecting-rod 40 of an eccentric-member 41, mounted upon and operated by said main driving-shaft 5. Upon the oscillation of said lever-member 37, as caused by said eccentric-member 41, the said propeller-bar 32 and its propelling-finger 86 is reciprocated in the guide-cradle 33, and the said propelling-finger on the rearward movement thereof engages and pushes the article or package and its wrapper through the sealing mechanism subsequently to be described. After this propelling movement of the propelling-finger is completed, the same must be returned to normal initial position in front of another article or package and its wrapper, which has in the meantime been delivered from said wrapping mechanism to said sealing mechanism, and to so do must be lowered so as to pass beneath the waiting article and its wrapper, and then raised again into normal propelling position. To accomplish this end the following mechanism is provided:—Pivotally connected with the free or oscillating end of said guide-cradle 33 is a yoke-frame 42, having on one side an upper roller 43, and on the other side a lower roller 44. Said yoke-frame is open so as to straddle said main driving shaft 5. Secured upon and operated by said main driving shaft 5 at one side of said yoke-frame 42 is a lifting cam member 45, which coöperates with said upper roller 43, and secured upon and operated by said driving shaft at the opposite side of said yoke-frame is a lowering cam member 46, which coöperates with said lower roller 44. Said cams are set to work oppositely, so that when the high part of one cam is operatively engaging its roller, the low part of the other cam is operatively engaged with its roller. As will be apparent the lifting cam lifts upward the yoke-member and consequently the cradle 33, so as to position the propelling-finger 86 in propelling position, maintaining the same in normal propelling plane while the propeller-bar 32 is moved rearwardly on said cradle 33. At the end of the propelling movement of said propeller-bar 32, the low part of the lifting cam approaches and engages the upper roller, and at the same time the high part of the lowering cam approaches and engages the lower roller, consequently said yoke-member is pulled downward, in turn causing the forward end of said cradle 33 to swing downward, thus inclining the latter downwardly while the propeller-bar 32 is moving forwardly therein or back to initial position. It follows, therefore, that as said propelling-finger 86 is carried downwardly as well as forwardly so that it will pass beneath the waiting article or package and its wrapper, which have been delivered in the meantime from said wrapping mechanism to said sealing mechanism, and as soon as the same has been passed beneath said article or package and its wrapper, the high part of the lifting cam again engages the upper roller to lift the yoke-frame and said cradle 33, and thus again project said propelling-finger 86 into normal initial propelling position. Of course it will be understood that said cam-members are so positioned or set upon the driving shaft 5 that their operations are performed in proper timed relation to the movements of the eccentric members, and consequently in proper timed relation to the propelling movements of the devices by means of which the articles or packages and their wrappers are moved through the sealing mechanism.

The sealing mechanism comprises a pair of longitudinally spaced fixed posts or studs 50 having downwardly extending dowel portions 51, which are fixed in openings 52 provided in one of said platform members 13. Said posts or studs 50 are provided with upwardly extending dowel portions 53. Mounted upon each post or stud 50, by engagement with said upwardly extending dowel portions 53, are inwardly extending bracket members 54, to the lower sides of which is secured a fixed longitudinally extending heating-plate or iron 55, the latter being of inverted L-shape in cross-section. The reference character 56 indicates a pair of longitudinally spaced laterally movable posts or studs having downwardly extending dowel portions 57, mounted in laterally disposed slots or openings 58 provided in the opposite platform member 13. Said posts or studs 56 are also provided with upwardly extending dowel portions 59. Mounted upon said posts or studs 56, by engagement with the dowel-portions 59, are inwardly extending bracket-members 60, to the lower sides of which is secured a longitudinally extending laterally movable heating plate or iron 61, the same being of inverted L-shape in cross section. Extending upwardly from said fixed heating-plate or iron 55, and located respectively adjacent to its ends, are supporting posts 62, to the upper ends of which is secured a heat retaining hood or cover member 63, preferably made of some heat insulating material such as asbestos or other desired substance. Said hood or cover member 63 is provided with depending longitudinal side walls 64, and lateral end walls 65, the latter terminating at the upper surface of the horizontal arms or portions of the respective heating-plates or irons 55 and 61.

The bracket-members 54 are each provided at their respective ends with upwardly projecting perforated ears or lugs 66, in which is supported a laterally extending stem or rod 67, the outer end of which projects through the adjacent side wall 64 of said hood or cover member 63, said outer end being provided with screw threads upon which is engaged a thumb-nut 68, adapted to bear against the outer surface of said side wall of the hood or cover-member 63.

The bracket-members 60 are each provided at their respective ends with upwardly projecting ears or lugs 69, each having an opening 70 slightly larger in diameter than the diameter of said stems or rods 67. The inner ends of said stems or rods 67 extend through said openings 70, so that said bracket-members 60 are movable upon said stems or rods. Fixed in said stems or rods 67, adjacent to their inner extremities are cross-pins 71, and arranged about each of said stems or rods 67 is a compression spring 72, one end of which abuts against said cross-pin 71, and the opposite end of which bears against the inner ear or lug 69 of each bracket-member 60. As thus related to the said stems or rods, and to said bracket-members 60, said springs 72 tend to press said bracket-members 60 inwardly, thereby tending to yieldingly move said heating-plate or iron 61 laterally toward said fixed heating-plate or iron 55, for purposes presently to be set forth.

The opposed longitudinal edges 73 of the horizontal portions of the respective heating-plates or irons 55 and 61 are obliquely disposed from end to end so that all portions of the upper surface of a wrapped article or package passed beneath the same will be operatively engaged by said heating-plates or irons, as will be understood.

Secured in any suitable manner upon the upper surface of the horizontal portions of said respective heating-plates or irons 55 and 61 are electrical heat generators 74 of the resistance type, the same having suitable terminals 75, two of which are preferably interconnected by an electric conductor 76 to connect the respective electrical heat generators 74 in series, the remaining terminal 75 of one electrical heat generator 74 is connected by the electric conductor 77 to one pole of a disconnector plug 78 and the remaining terminal 75 of the other electrical heat generator is connected by means of the electric conductor 79 to the other pole of said disconnector plug 78. The reference character 80 indicates a suitable electric rheostat which is connected in the incoming line 81 of a source of electric current, said incoming line 81 being connected with one pole of the separable member 82 of said disconnector plug 78. The return or outgoing line 83 leading back to the source of electric current is connected with the other pole of said separable member 82 of said disconnector plug 78. The respective bracket members 54 and 60 are cut away on their under side to provide openings 84 through which said respective heat generators 74 may extend.

The reference character 85 indicates a suitable handle member connected with and projecting upwardly from said hood or cover member 63. When desired the sealing mechanism constructed as above described may readily be lifted off and away from the platform members 13 by said handle-member, which when grapsed and raised, after disconnecting the disconnector-plug 78, removes the mechanism by withdrawing the downwardly projecting dowels 51 and 57 out of the openings in said platforms 13 in which they are normally engaged.

When an electric current is passed through said electric heat generators 74, the same produce heat which is transmitted to and radiated from said respective heating plates or irons 55 and 61 to which said generators are attached.

After the wrapped package or article has been delivered from the wrapping mechanism to the forward end of the heating devices, the same is engaged by a propelling finger 86 connected with and operated by the propeller bar 32 and its operating mechanism, and upon the rearward movement of said propelling finger 86 is pushed between the heating plates or irons 55 and 61, the vertical flanges of which engage the ends of the wrapped package or article and the end folds there located, while the horizontal flanges of the same engage the upper surface of the wrapped package or article and the longitudinal fold 47 there located. The spring pressed laterally movable heating plate or iron 61 forces the wrapped package endwise against the fixed heating plate or irons 55, thereby exerting a firm pressure on the end folds 48 and 49 of the wrapper, while gravity tends to press downwardly the horizontal flanges of the respective heating plates or irons upon the upper surface of the package. The heat radiated by the heating plates or irons, while thus in contact with the wrapped package, tends to melt, slightly, the wax or paraffin content of the wrapper 11, and thereby causes the several wrapping folds to fuse or adhere together, in a manner clearly to be understood, so that when the wrapper cools the wax or paraffin content of the wrapper again congeals or hardens whereby the wrapping folds are sealed together, and thus form an air-tight sealed envelop about the article or package.

As the propelling finger 86 completes its propelling movement it ejects the wrapped package or article from beneath the heating or ironing plates 55 and 61 and into engagement with cooling devices. The said cooling devices comprise a pair of longitudinal ribs 87, between which is provided a guideway 88. Located at suitable intervals upon said ribs 87 are upwardly extending studs 89. The reference character 90 indicates a top-plate, provided with laterally extending battens 91, the ends of which are perforated to engage said studs 89, and thus retain said top-plate against undue lateral or longitudinal movement while permitting a free vertical lifting movement thereof. A laterally extending leaf-spring 92, mounted on a post 93, extends over said top-plate and engages a centrally disposed stud 94, thereby backing said top-plate yieldably against upward vertical movement. Located at one side of the receiving end of said guideway 88 is a spring-pressed tension bar or shoe 95, which engages the wrapped package as it leaves the sealing devices, and exercises an endwise pressure on the wrapped package, adapted to prevent the end-folds of the package from opening up before the heated wax or paraffin content of the wrapper has had time to set or harden. Said tension bar or shoe is provided with a screw threaded stem 96, extending slidably through the adjacent rib 87, around which is arranged a spring 97 between the shoe and the rib. The outwardly projecting end of said stem 96 is provided with a thumb-nut 98 for adjusting the tension of said spring and fixing the position of said shoe. Extending longitudinally along the inner side of said rib 87, to the rear of said shoe 95 is a yieldable spring pressed side-plate 99 supported by outwardly extending screw threaded stems 100, which pass slidably through said rib 87, and around which the springs 101 are arranged between the side-plate 99 and the rib 87, said outwardly projecting stems 100 having thumb-nuts 102 thereon, for adjusting both the tension of the springs 101, and the position of said side-plates. Said top-plate and side-plate and opposite package engaging rib 87 being of metal, and removed from the heating influences of the sealing devices, are cool and serve, when engaging or contacting with the wrapped and sealed articles or packages, to harden or set the wax or paraffin content of the wrappers before the wrapped and sealed articles or packages are finally ejected from the machine. The articles are propelled in a train through said cooling devices thus provided, each newly entering package pushing its predecessors ahead of it until the same are finally ejected from beneath said top-plate 90, and consequently the wrapped and sealed articles or packages remain in contact with said cooling devices for an appreciable length of time, so that the setting or hardening of the paraffin or wax content of the wrapper has ample time to be completed before final liberation of the packages or articles from the machine.

I am aware that changes may be made in the general arrangements and combinations of the various devices and parts, as well as in the details of the construction of the same, without departing from the scope of my present invention as set forth in the foregoing specification, and as defined in the appended claims. Hence, I do not limit my invention to the exact arrangements and combinations of the devices and parts as described in the said specification, nor do I confine myself to the exact details of the construction of said parts as illustrated in the accompanying drawings.

I claim:—

1. In a device of the kind described a sealing mechanism comprising platform members for supporting wrapped articles, a pair of heating plates shaped to engage the end and longitudinal wrapped folds, means for supporting said heating plates above said platform members, said heating plates being so supported that gravity presses the same against the longitudinal wrapper folds, spring-means adapted to press one of said heating plates toward the other and thus against the end wrapper folds, electrical heat generating means connected with each heating plate, and means for propelling the wrapped article in contact with said heating-plates.

2. In a device of the kind described a sealing mechanism comprising platform members for supporting wrapped articles, a pair of heating plates shaped to engage the end and longitudinal wrapped folds, means for supporting said heating-plates above said platform members, said heating-plates being so supported that gravity presses the same against the longitudinal wrapper folds, a spring-means adapted to press one of said heating plates toward the other and thus against the end wrapper folds, electrical heat generating means connected with each heating plate, means for propelling the wrapped article in contact with said heating-plates, and cooling devices into engagement with which said wrapped articles or packages are propelled upon ejection from said sealing mechanism.

3. In a device of the kind described a sealing mechanism comprising platform members for supporting wrapped articles, a pair of heating plates shaped to engage the end and longitudinal wrapped folds, means for supporting said heating-plates above said platform members, said heating-plates being so supported that gravity presses the same against the longitudinal wrapper folds, a spring-means adapted to press one of said heating plates toward the other and thus against the end wrapper folds, electrical heat generating means connected with each heating-plate, means for propelling the wrapped article in contact with said heating-plates, and cooling devices into engagement with which said wrapped articles or packages are propelled upon ejection from said sealing mechanism, comprising a pair of side ribs providing a guideway, a top-plate, means for supporting said top-plate above said guideway, and spring pressed means associated with one rib to exert endwise pressure on the wrapped and sealed package entering said guideway.

4. In a device of the kind described a sealing mechanism comprising platform members for supporting wrapped articles, a pair of heating-plates shaped to engage the end and longitudinal wrapper folds, means for supporting said heating-plates above said platform members, said heating-plates being so supported that gravity presses the same against the longitudinal wrapper folds, spring means adapted to press one of said heating plates toward the other and thus against the end wrapper folds, electrical heat generating means connected with each heating plate, and means for propelling the wrapped article in contact with said heating-plates, and a heat retaining hood extending over said heating plates.

5. In a device of the kind described a sealing mechanism comprising platform members for supporting wrapped articles, a pair of heating plates shaped to engage the end and longitudinal wrapper folds, means for supporting said heating plates above said platform members, said heating plates being so supported that gravity presses the same against the longitudinal wrapper folds, spring means adapted to press one of said heating plates toward the other and thus against the end wrapper folds, electrical heat generating means connected with each heating plate, means for propelling the wrapped article in contact with said heating-plates, a heat retaining hood extending over said heating-plates, and cooling devices into engagement with which said wrapped articles or packages are propelled upon ejection from said sealing mechanism.

6. In a device of the kind described a sealing mechanism comprising platform members for supporting wrapped articles, a pair of heating plates shaped to engage the end and longitudinal wrapper folds, means for supporting said heating plates above said platform members, said heating-plates being so supported that gravity presses the same against the longitudinal wrapper folds, spring means adapted to press one of said heating plates toward the other and thus against the end wrapper folds, electrical heat generating means connected with each heating plate, means for propelling the wrapped article in contact with said heating-plates, a heat retaining hood extending over said heating plates, and cooling devices into engagement with which said wrapped articles or packages are propelled upon ejection from said sealing mechanism, comprising laterally spaced ribs supported upon said platform members to provide an intervening guideway, a spring pressed top-plate for engaging the longitudinal wrapper folds, an independent spring-pressed shoe projecting from one rib at one side of the entrance to said guideway, and a spring-pressed side-plate connected with said last mentioned rib to the rear of said spring-pressed shoe, said shoe and said side-plate being adapted to exert endwise pressure upon the wrapped article.

7. A sealing mechanism for wrapping machines comprising platform members, a pair of laterally opposed longitudinally extending inverted L-shaped heating-plates, the horizontal flange of each heating plate having an obliquely disposed longitudinal free edge, the same being in parallel opposed relation one to the other, means for fixedly supporting one of said heating-plates, means for supporting the other heating-plate so that it is capable of lateral movement toward and away from said fixed heating-plate, the supporting means of said heating-plates being detachably connected with said platform members, spring means for pressing said movable heating-plate toward said fixed heating-plate, means for adjusting the tension of said spring means, electrical heat generating devices connected with each heating-plate, and a heat retaining hood extending over and connected with said heating-plates.

8. A sealing mechanism for wrapping machines comprising platform members, a pair of laterally opposed longitudinally extending inverted L-shaped heating-plates, the horizontal flange of each heating plate having an obliquely disposed longitudinal free edge, the same being in parallel opposed relation one to the other, means for fixedly supporting one of said heating-plates, means for supporting the other heating-plates so that it is capable of lateral movement toward and away from said fixed heating-plate, the supporting means of said heating-plates being detachably connected with said platform members, spring means for pressing said movable heating-plate toward said fixed heating-plate, means for adjusting the tension of said spring means, electrical heat generating devices connected with each heating-plate, a heat retaining hood extending over and connected with said heating-plates, and means for propelling a wrapped article beneath and between said heating-plates.

9. A sealing mechanism for wrapping machines comprising platform members, a pair of laterally opposed longitudinally extending inverted L-shaped heating-plates, the horizontal flange of each heating plate having an obliquely disposed longitudinal free edge, the same being in parallel opposed relation one to the other, means for fixedly supporting one of said heating-plates, means for supporting the other heating-plate so that it is capable of lateral movement toward and away from said fixed heating-plate, the supporting means of said heating-plates being detachably connected with said platform members, spring means for pressing said movable heating-plate toward said fixed heating-plate, means for adjusting the tension of said spring means, electrical heat generating devices connected with each heating-plate, a heat retaining hood extending over and connected with said heating-plates, means for propelling a wrapped article beneath and between said heating-plates, and cooling devices into engagement with which said wrapped articles or packages are propelled upon ejection from said sealing mechanism.

10. A sealing mechanism for wrapping machines comprising platform members, a pair of laterally opposed longitudinally extending inverted L-shaped heating-plates, the horizontal flange of each heating plate having an obliquely disposed longitudinal free edge, the same being in parallel opposed relation one to the other, means for fixedly supporting one of said heating-plates, means for supporting the other heating-plate so that it is capable of lateral movement toward and away from said fixed heating-plate, the supporting means of said heating-plates being detachably connected with said platform members, spring means for pressing said movable heating-plate toward said fixed heating-plate, means for adjusting the tension of said spring means, electrical heat generating devices connected with each heating-plate, a heat retaining hood extending over and connected with said heating-plates, means for propelling a wrapped article beneath and between said heating-plates, and cooling devices into engagement with which said wrapped articles or packages are propelled upon ejection from said sealing mechanism, comprising laterally spaced ribs supported upon said platform members to provide an intervening guideway extending longitudinally from the rear end of said heating-plates, a spring-pressed top-plate for engaging the longitudinal wrapper folds, means for supporting said top-plate on said ribs against lateral and longitudinal movement, and means for exerting endwise pressure upon the wrapped and sealed article passing through said guideway beneath said top-plate.

11. A sealing mechanism for wrapping machines comprising platform members, a pair of laterally opposed longitudinally extending inverted L-shaped heating-plates, the horizontal flange of each heating plate having an obliquely disposed longitudinal free edge, the same being in parallel opposed relation one to the other, means for fixedly supporting one of said heating-plates, means for supporting the other heating-plate so that it is capable of lateral movement toward and away from said fixed heating-plate, the supporting-means of said heating-plates being detachably connected with said platform members, spring means for pressing said movable heating-plate toward said fixed heating-plate, means for adjusting the tension of said spring means, electrical heat generating devices connected with each heating-plate, a heat-retaining hood extending over and connected with said heating-plates, means for propelling a wrapped article beneath and between said heating-plates, and cooling devices into engagement with which said wrapped articles or packages are propelled upon ejection from said sealing mechanism, comprising laterally spaced ribs supported upon said platform members to provide an intervening guideway extending longitudinally from the rear end of said heating-plates, a spring-pressed top-plate for engaging the longitudinal wrapper folds, means for supporting said top-plate on said ribs against lateral and longitudinal movement, a spring-pressed shoe projecting from one rib into said guideway adjacent to the entrance thereto, and a spring-pressed side-plate connected with said last mentioned rib to the rear of said shoe, said shoe and said side-plate being adapted to exert endwise pressure upon the wrapped and sealed article.

In testimony that I claim the invention set forth above I have hereunto set my hand this 12th day of April, 1917.

GEORGE I. HOHL.

Witnesses:
GEORGE D. RICHARDS,
FREDK. H. W. FRAENTZEL.